United States Patent
Maniscalco

[15] 3,639,725
[45] Feb. 1, 1972

[54] STEAM-GENERATING APPARATUS
[72] Inventor: Thomas J. Maniscalco, 7 Orian Pl., Glen Cove, N.Y. 11542
[22] Filed: Mar. 3, 1971
[21] Appl. No.: 120,449

[52] U.S. Cl. ...........................................................219/401
[51] Int. Cl. ..........................................................A21b 1/02
[58] Field of Search...................219/332, 334, 401, 362, 271

[56] References Cited

UNITED STATES PATENTS 3,450,487  6/1969  Wallden............................219/271 X

FOREIGN PATENTS OR APPLICATIONS 605,265  7/1948  Great Britain.........................219/401

Primary Examiner—Bernard A. Gilheany
Assistant Examiner—F. E. Bell
Attorney—Robert R. Strack and James A. Eisenman

[57] ABSTRACT

Apparatus particularly useful for preparation of foods wherein a portable steam-generating unit is adapted for cooperation with a proximate dry heat oven chamber to provide steam for controlled periods of time, and at controlled pressures.

5 Claims, 6 Drawing Figures

PATENTED FEB 1 1972
3,639,725
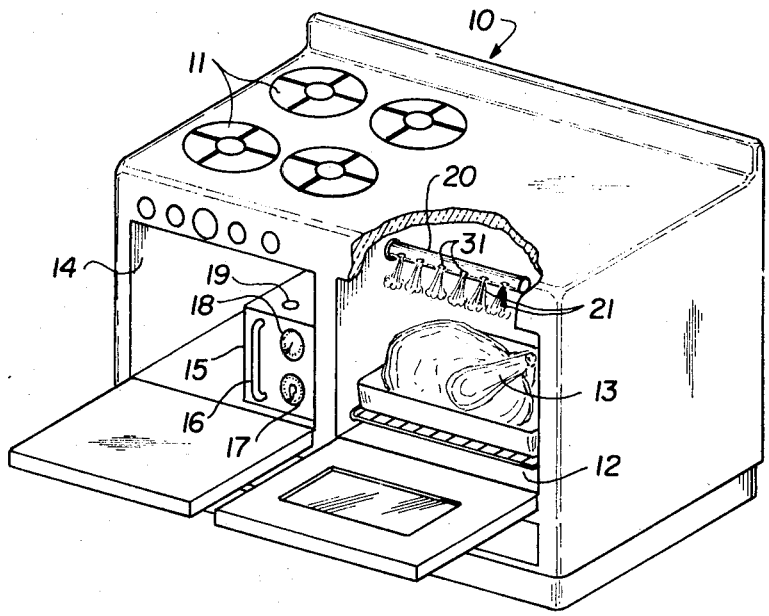
FIG.1
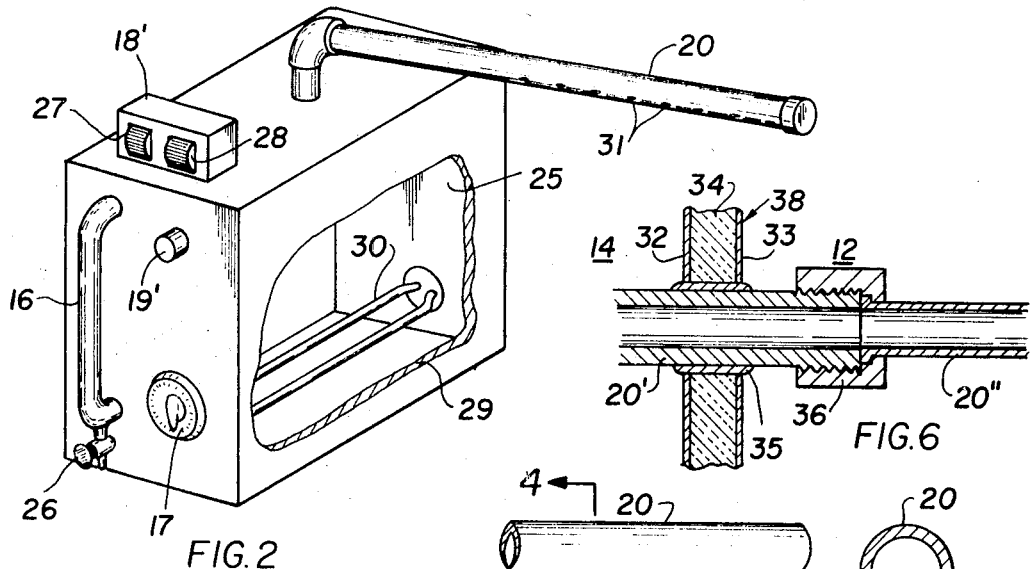
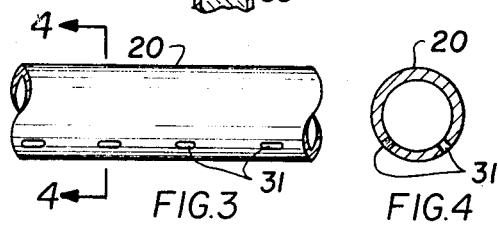
FIG.5
INVENTOR
THOMAS J. MANISCALCO
BY *Eisenman and Strack*
ATTORNEYS

STEAM-GENERATING APPARATUS

BACKGROUND OF THE INVENTION

1. Field of the Invention

This invention relates to steam generating apparatus; more particularly, it relates to steam-generating apparatus which may be advantageously employed in order to either provide supplementary moist heat in conjunction with normal dry heat cooking or to facilitate steam cooking per se.

2. Description of the Prior Art

It has been recognized in the past, although primarily by professional and commercial baking and cooking enterprises, that food cooked by steam is often more palatable, easier to digest, and more nourishing, than food cooked with dry heat. In addition, when steam is utilized in the manner customarily employed in commercial baking operations, it is possible to accelerate the normal baking process by such operations as "proofing" doughs in steam boxes prior to the actual baking. The availability of steam boxes has also rendered it possible to quickly thaw prefrozen foods prior to crisping in a dry heat oven. Still further, it is known to remoisturize food which has been dried out due to either excessive exposure to air or dry heat, or due to over cooking.

The use of steam by commercial baking and cooking concerns, has not been reflected in the use of steam by smaller establishments or the average housewife. Instead, smaller concerns and housewives have been restricted to the use of conventional dry ovens. It is noted that professional cooks and bakers have at times suggested the inclusion of a pan of water in the usual oven in order to provide moisture to replace that which has been lost during baking or roasting; however, this has proven to be a generally unsatisfactory technique. It has also been recognized that during roasting, basting is desirable. In fact, there are devices for carrying out automatic basting which drip fluids directly onto the article being roasted or cooked.

The many advantages of steam in conjunction with food preparation have hitherto been unavailable to the average housewife and smaller commercial baking establishments, such as diners and pizza kitchens, because the steam-producing apparatus required complicated installations connected with the plumbing and electrical supply.

SUMMARY OF THE INVENTION fluid

The present invention relates to apparatus for converting dry heat ovens and the like into units capable of steam cooking either individually or in combination with the existing source of dry heat.

In a particular embodiment, the present invention takes the form of a self-contained electrically heated water chamber which generates steam under controlled pressure and disperses this steam within the existing dry heat chamber of an oven or similar unit. The apparatus of the present invention does not require interconnection with existing plumbing and, when used with electricity requires merely the provision of a source of electrical power for the heating element therein. The unit is designed for positioning within the conventional utility compartments of standard gas and electric ranges and can be installed with minor modifications to such ranges. The invention is also suitable for permanent incorporation in gas and electric ranges in which case the apparatus may be in the form of a liquid containing partition adjacent to the oven wall and connected via a steam emitting member to the oven chamber itself. With such an integrated installation, the oven heating elements may be supplemented to provide the necessary heat for steam generation.

It is an object of the present invention to provide improved steam-generating apparatus.

It is another object of the present invention to provide improved steam-generating apparatus specifically designed for cooperation with existing dry heat ovens.

It is another object of the present invention to provide a portable steam-generating apparatus, which is completely self-contained and which requires interconnection only with a source of electric power to effect its continuous automatic operation.

It is another object of the invention to provide an improved steam-generating apparatus wherein the steam generated may be controlled as to time and pressure by automatic controls which are manually settable by an operator.

In accordance with the invention, there is provided a chamber for storing water, a heating element within this chamber connectable to a source of power for heating the water above the boiling point, means for controlling the duration of energization of the heating element, means for controlling energization of said heating means in accordance with the pressure of the steam generated within the chamber, and a steam-emitting member projecting from the upper portion of said chamber having a plurality of steam-emitting apertures therein.

In accordance with another aspect of this invention, the above-described apparatus is utilized in combination with a dry heat oven wherein said projecting member is disposed in the upper portion of said dry heat oven and the apertures emit steam into the lower portion thereof.

A more complete appreciation of the features of the present invention will be available following a study of the detailed description which is made in conjunction with the attached drawings.

BRIEF DESCRIPTION OF THE DRAWINGS

FIG. 1 is a perspective view of a conventional gas or electric range having an oven compartment and including a portable steam-generating apparatus of the type contemplated in one embodiment of the present invention;

FIG. 2 is a perspective illustration of a portable steam-generating apparatus generally similar to that shown in FIG. 1, wherein a portion of the sidewall is broken away to reveal an internal electric heating element;

FIG. 3 is an elevation view of the steam-emitting member associated with the steam-generating apparatus;

FIG. 4 is a cross-sectional view taken along the line 4—4 in FIG. 3 and illustrating the discharge apertures in a typical steam-emitting member utilized in conjunction with the invention;

FIG. 5 is an illustrative circuit diagram showing the control elements used with a typical embodiment of the invention; and FIG. 6 is a cross-sectional view through the wall of a typical oven installation, illustrating the connection of a portable steam-generating unit with a removable steam-emitting member.

DESCRIPTION OF THE PREFERRED EMBODIMENT

FIG. 1 illustrates a conventional gas or electric range 10, having surface heating elements 11 and an oven chamber 12. A turkey or other product 13 is shown within the oven 12 for illustrative purposes. In a storage compartment 14 disposed adjacent to the oven chamber, a portable steam-generating unit 15 is located. This unit is preferably positioned proximate to the oven wall and a steam-emitting member 20 projects through an aperture 22 in the oven wall, into the upper portion of the oven chamber. Apertures 31 in the steam-emitting member direct steam 21 downward toward the product to be treated. Unit 15 may include a water level indicator 16, a timer 17, a steam gauge 18, and a water filling aperture 19. These elements will be considered in more detail in connection with FIGS. 2 and 5.

As more clearly shown in FIG. 2, the water level indicator 16 may take the form of a transparent tube having upper and lower openings into the water chamber 25 and may include a petcock 26 at the lower end for emptying the indicator and chamber if desired. The timer 17 may be of any conventional type and when electricity is used it is adapted for serial interconnection within the electric heater circuit in order to effect energization of the heater for any desired period of time. In FIG. 2, the steam gauge 18' is of the form wherein upper and lower indicator controls 27 and 28, respectively, may be set by thumb wheel to any desired level. The pressure sensing elements of the steam gauge are connected to the water chamber 25 through the upper wall of the unit and consequently it is directly operated upon by the steam generated therein.

As distinguished from the showing in FIG. 1, the water input aperture 19' in FIG. 2 appears on the front face of the apparatus. This is an optional positioning and will be found to be of value in installations where the apparatus is set back from the face of the chamber within which it is located. Ancillary elements may be provided in conjunction with the water input aperture in order to develop a funnellike port when the sealing cap is removed.

Looking within the water chamber 25 through the broken away portion 29, the heating coil 30 is visible. The specific form these coils take will vary with the amount of heat to be generated. In a preferred embodiment of the invention, it has been found suitable to utilize electric heating elements disposed near the lower portion of a water chamber. Nevertheless, if an integrated assembly is provided wherein the seam generating apparatus is part of an electric or gas range, the heating coil may occupy a larger area of the water chamber, or it may be replaced by suitably positioned gas jets.

The steam-emitting member 20 is illustrated in FIG. 2 as projecting from the top of the water chamber 25 and furthermore is seen to be disposed at a slightly increasing angle above the horizontal. This orientation of member 20 is required in order to insure that any condensation of the steam will flow back into the water chamber 25. In this regard, it is also found preferable to have the lower edges of the apertures 31 slightly raised from the bottom in order to provide a channel for conveying any condensation back to the water chamber. Thus, FIG. 4 illustrates a cross-sectional view of member 20 wherein apertures 31 are arranged in the third and fourth quadrant positions. The number and size of apertures 31 are selected in accordance with the amount of steam desired to be emitted under the pressures to be utilized with the particular apparatus. It will be further appreciated that member 20 may be connected to either the top or upper side portions of the water chamber, in accordance with the design preference and the location this unit is to occupy. It has been found advantageous to position steam-emitting member 20 in the upper portion of conventional ovens, either toward the front or toward the rear. The apertures 31 are then oriented to provide maximum steam coverage of products disposed within the oven chamber.

An enlarged view of the wall connecting a typical oven chamber 12 and adjacent storage space 14, is presented in FIG. 6. In this Figure, the projecting member 20 is divided into portions 20' and 20''. The oven wall 31 is made up of typical sheet metal walls 32 and 33 with an internal insulating or refractory portion 34. The aperture through which member 20 projects may be sealed by insulating means 35, if desired. A fluidtight coupling 36 is used to join portion 20' which would be secured to the water chamber with portion 20'' which projects into the oven. The coupling is designed to permit rotation of extending portion 20'' in order to direct the steam as desired. The utilization of this coupling also makes it possible for the user to remove the steam-emitting member 20' when not in use. Upon removal, the end of member 20' may be either covered or left open as desired.

FIG. 5 illustrates a typical energization circuit for a heating element 30. This circuit includes a suitable plug or connecting means for connection with the standard electrical supply. It also includes in the series connection, the timer 17 and steam pressure switch 18. Timer 17 is the primary actuation element in this circuit and whenever the timer is actuated, the circuit will remain energized subject to control by the steam pressure switch 18. The steam pressure switch is preferably of the type having upper and lower pressure limits such that when the steam exceeds the upper limit it opens the energization path through heating element 30 and when it is below a predetermined setting, it closes the circuit to the heating element. Thus, the pressure of the steam within chamber 25 is maintained within a controlled range.

It has been found that the particular pressure utilized will depend upon the general usage of the steam and this in turn will vary in accordance with the oven with which the apparatus is associated. For example, in home use a steam pressure range of 2 to 4 pounds per square inch may be found to be entirely acceptable; however, in connection with pizza ovens and the like, it has been found that pressures ranging up to 8 pounds per square inch are desirable. In all instances, the length of projecting member 20, the number and size of apertures 31, and the size of the oven itself, are factors which must be taken into consideration in order to optimize operation of the equipment.

During usual operation with this equipment, it is charged with water via input port 19 or 19' and gauge 16 indicates the level attained by the fluid within chamber 25. Thereafter, timer 17 is set for the duration desired and the heating element is automatically energized. As the heating element warms the water within the chamber 25, and the boiling point is attained and the steam is soon generated. This steam then proceeds through steam-emitting member 21 and enters the oven chamber 12 via apertures 31. In the event that the emission of steam from chamber 25 is at a slower rate than its generation and the pressure tends to build up beyond the selected level, steam pressure switch 18 is actuated and the heating element is turned off until the pressure reaches some lower selected level.

It will be appreciated that a particular embodiment of the invention has been illustrated in conjunction with a particular type of conventional range. Reference has also been made to such commercial ovens as those utilized for pizza baking. Obviously, the utilization of the invention in combination with other ovens is within the contemplation of the inventor. The basic principles disclosed and discussed hereinabove are applicable in each installation and the advantages of being entirely portable and independent of conventional plumbing connections will be recognized in such contemplated installations. It is also within the contemplation of the invention that certain installations may not require the availability of a manually settable pressure gauge by the operator and the amount of timer actuation may also be of minimum importance to an operator.

It should also be appreciated that the various controls illustrated on the unit of the present invention may, if desired, be remotely located, such as on the dial face of conventional gas and electric ranges. Where the unit is incorporated into such ranges upon manufacture, other inlets and outlets for water and power may be integrated within the design of such ranges. Still further, when the apparatus of the invention is integrated into a range, one may employ the primary hear source of the range, e.g., gas, to supply sufficient heat for boiling the water in an auxiliary water chamber to produce steam.

In certain installations, it may also be deemed desirable to insert impeller means and/or a water bottle between the steam-emitting member and the water chamber. The use of an impeller will assist in regulating the rate of steam emission in relation to the rate of steam generation, and the impeller can be controlled by the steam pressure switch. The water bottle may prove effective where the respective locations of the water chamber and oven chamber require other than the optimum pitch for the steam-emitting member.

All modifications to the embodiments disclosed herein, which come within the spirit and teachings of this invention, are intended to be included within the scope of the following claims.

What is claimed is:

1. Steam-cooking apparatus comprising in combination, a steam-generating unit having means for storing discrete amounts of water, and means for heating said water above the boiling point; an oven chamber disposed adjacent to said steam-generating unit and having means for heating said chamber; and steam-emitting means connected to said steam-generating unit and projecting into the upper portion of said oven chamber, said steam-emitting means being elongated in form and having apertures located in the portion projecting into said oven chamber to emit the steam produced by said steam-generating unit.

2. Steam-cooking apparatus as defined in claim 1, wherein said steam-emitting means comprises a portion secured to said steam-generating unit and a detachable portion, said portions being connectable by a fluidtight coupling to position said detachable portion at an angle above the horizontal.

3. Steam-cooking apparatus as defined in claim 2, wherein common heating means are employed for said steam-generating unit and said oven chamber.

4. Steam-cooking apparatus as defined in claim 2, wherein separate heating means are used for each of said steam-generating unit and said oven chamber, the heating means for said steam-generating unit having means for selective energization thereof over controlled durations of time, and steam pressure responsive means operative to effect deenergization when said pressure in the steam-generating unit exceeds a first predetermined amount and to permit energization when said pressure is below a second predetermined amount.

5. Steam-cooking apparatus as defined in claim 4, wherein the detachable portion of said steam-emitting means contains at least one array of apertures therein and an axially aligned channel portion for conveying condensed steam to said water chamber.

* * * * *